US011174100B2

(12) United States Patent
Mallady (10) Patent No.: US 11,174,100 B2
(45) Date of Patent: Nov. 16, 2021

(54) CONTAINER TRANSPORTER AND METHODS

(71) Applicant: Roy Mallady, Atlanta, GA (US)

(72) Inventor: Roy Mallady, Atlanta, GA (US)

(*) Notice: Subject to any disclaimer, the term of this patent is extended or adjusted under 35 U.S.C. 154(b) by 0 days.

(21) Appl. No.: 16/853,888

(22) Filed: Apr. 21, 2020

(65) Prior Publication Data

US 2020/0247608 A1 Aug. 6, 2020

Related U.S. Application Data

(63) Continuation of application No. 16/476,148, filed as application No. PCT/US2018/012582 on Jan. 5, 2018, now Pat. No. 10,625,934.

(60) Provisional application No. 62/442,746, filed on Jan. 5, 2017.

(51) Int. Cl.
| | |
|---|---|
| *B62D 51/04* | (2006.01) |
| *B65F 1/14* | (2006.01) |
| *B62B 3/06* | (2006.01) |
| *B62B 3/10* | (2006.01) |
| *B62B 5/00* | (2006.01) |

(52) U.S. Cl.
CPC .......... *B65F 1/1468* (2013.01); *B62B 3/0612* (2013.01); *B62B 3/104* (2013.01); *B62B 5/0076* (2013.01); *B62B 2202/20* (2013.01); *B62B 2203/10* (2013.01); *B65F 2210/165* (2013.01)

(58) Field of Classification Search
CPC ........ B65F 1/1468; B65F 1/1452; B65F 1/14; B65F 2210/165; B65F 2210/138; B65F 2210/168; B65F 2210/172; B62B 3/0612; B62B 3/104; B62B 3/00; B62B 3/06; B62B 3/10; B62B 3/0618; B62B 3/08; B62B 3/0643; B62B 5/0076; B62B 5/0026; B62B 5/0033; B62B 5/0053; B62B 5/0056; B62B 5/0069; B62B 5/0096; B62B 2202/20; B62B 2203/10; B62B 2203/07; B62B 2203/40; B62B 2203/071; B62B 2203/073

See application file for complete search history.

(56) References Cited

U.S. PATENT DOCUMENTS

| | | | | |
|---|---|---|---|---|
| 4,313,612 | A | * | 2/1982 | Rubens ................... B62B 3/04 280/79.5 |
| 5,565,846 | A | | 10/1996 | Geiszler et al. |
| 6,742,673 | B2 | | 6/2004 | Credle, Jr. et al. |
| 7,712,558 | B2 | | 5/2010 | Helson et al. |

(Continued)

FOREIGN PATENT DOCUMENTS

| | | |
|---|---|---|
| EP | 2192021 A2 | 6/2010 |
| WO | 2015120384 A1 | 8/2015 |

OTHER PUBLICATIONS

International Search Report and Written Opinion in PCT Application No. PCT/US2018/12582 dated Mar. 2018.

*Primary Examiner* — James M Dolak (74) *Attorney, Agent, or Firm* — Troutman Pepper Hamilton Sanders LLP; Ryan A. Schneider (57) ABSTRACT

A container transporter systems, vehicle, and methods are disclosed. The container transporter can be automatically or manually controlled allowing for ease of use in moving a coupled container. The container transporter can be used with virtually any container, such as a refuse container. The automatic movement of the container transporter can assist users with time constrains or physical constraints in moving their refuse for pickup.

18 Claims, 8 Drawing Sheets

(56) References Cited

U.S. PATENT DOCUMENTS

| | | |
|---|---|---|
| 8,146,695 B1 | 4/2012 | Ramshur |
| 8,695,736 B1 | 4/2014 | Samaroo |
| 9,440,698 B2 | 9/2016 | Dadoosh et al. |
| 9,908,695 B1 | 3/2018 | Thompson |
| 9,994,416 B2 * | 6/2018 | Worton ................ B65H 75/146 |
| 10,046,910 B2 | 8/2018 | Wagner et al. |
| 10,152,737 B2 * | 12/2018 | Lyman .................. G01G 19/08 |
| 10,286,558 B1 * | 5/2019 | Asada .................... B25J 13/003 |
| 10,481,607 B2 * | 11/2019 | Dumitras ............. B65F 1/1468 |
| 10,494,171 B2 | 12/2019 | Lavoie |
| 10,558,829 B2 | 2/2020 | Jones et al. |
| 10,570,000 B2 | 2/2020 | High et al. |
| 10,576,017 B2 * | 3/2020 | Soucy ....................... B60P 3/00 |
| 10,603,119 B2 * | 3/2020 | Ross .................... A61B 50/13 |
| 10,610,073 B1 * | 4/2020 | Lucas ................... A47L 9/2873 |
| 10,625,934 B2 * | 4/2020 | Mallady ................. B62B 3/104 |
| 10,633,180 B2 * | 4/2020 | Salinas ..................... B65F 3/02 |
| 10,689,021 B2 * | 6/2020 | Deshpande ............. B62B 5/002 |
| 10,793,208 B2 * | 10/2020 | Tengvert .............. B62D 51/005 |
| 10,814,896 B2 * | 10/2020 | Eagan, Jr. ................ B62B 1/264 |
| 10,857,925 B1 * | 12/2020 | Sahota ..................... B60K 1/04 |
| 10,875,708 B2 * | 12/2020 | Wolfenden ................ B65F 1/12 |
| 10,988,310 B2 * | 4/2021 | Moore ...................... A47L 5/38 |
| 10,994,927 B2 * | 5/2021 | Schuster ................ B62B 3/104 |
| 2003/0002966 A1 | 1/2003 | Porter |
| 2005/0127625 A1 | 6/2005 | Zimmer |
| 2005/0281653 A1 | 12/2005 | Channel |
| 2008/0066819 A1 * | 3/2008 | Attanasio .............. B62B 5/0083 |
| | | 137/899 |
| 2008/0140253 A1 * | 6/2008 | Brown .................. B65F 1/1473 |
| | | 700/245 |
| 2009/0008888 A1 | 1/2009 | Boulden |
| 2010/0078233 A1 | 4/2010 | Fletcher et al. |
| 2016/0260161 A1 | 9/2016 | Atchley et al. |
| 2018/0079591 A1 * | 3/2018 | Doty ..................... H04W 4/024 |

* cited by examiner

CONTAINER TRANSPORTER AND METHODS

CROSS REFERENCE TO RELATED APPLICATIONS

This Application is a continuation of U.S. Non-Provisional patent application Ser. No. 16/476,148, filed 5 Jul. 2019, (now U.S. Pat. No. 10,625,934) entitled "Container Transporter and Methods," which is a National Stage Entry of PCT Application No. PCT/US2018/012582 filed 5 Jan. 2018 which claims benefit under 35 U.S.C. § 119(e), to U.S. Provisional Application No. 62/442,746 filed 5 Jan. 2017. The entire contents and substance of the above applications are hereby incorporated by reference.

BACKGROUND

1. Field of the Invention

Various embodiments of the disclosed vehicle relate to a container transporter, and more particularly, to a container transporter that can travel automatically from a parking or docking location to a second location. For example, the container transporter can move a refuse container to the curb for mechanical pick up and emptying by a garbage truck, and return the empty refuse container to its storage location before returning to a parking or docking station.

2. Background of Related Art

Conventional and widely used waste or refuse containers are of a molded plastic material having a hinged lid and four to five feet tall. Such a container includes a pair of wheels at the back side beneath a bar useable to pull the container by rolling it along the ground. Upon righting the container, the bottom edge of the front side rests on the ground and provides sufficient frictional contact with the ground to limit rolling except on relatively steep inclines.

These refuse containers are usually parked at the end of a driveway adjacent a residence or behind a fence or wall to avoid visibility from the street. Once or twice a week, the residential user rolls the container to the curb and a garbage truck comes by the curb to pick up, lift and empty the contents of a refuse container into a bin of the garbage truck. Thereafter, the empty container is set on the ground adjacent the curb.

As discussed, the container transporter has to be delivered to the curb, usually by hand along a path on top of the driveway. The refuse container, upon emptying, has to be retrieved from the curb and returned to its storage location. Those individuals with physical handicaps, limited strength, or insufficient time can have difficulty in moving a filled, heavy refuse container to the curb and bringing back the emptied refuse container. If the driveway is inclined, unfinished or unpaved the difficulty of moving the container transporter is exacerbated. If the driveway is inclined downwardly toward the curb, it requires a significant amount of strength to keep the container transporter from rolling too fast and going out of control. To pull an emptied refuse container up a driveway can additionally create difficulty.

What is needed, therefore, is a vehicle or transportation system suitable for use with the varying standardized refuse containers mandated in different locals to automate the process of container travel to and from the curb. Additionally, the vehicle or transportation system should be usable with any refuse container already possessed by the user. It is to such a system that embodiments of the container transporter are primarily directed.

SUMMARY

It is a primary object of the container transporter to provide an automated, self-propelled container transporter capable of independent travel from a parking or docking location to a location for pick up by a refuse collection truck and return to the parking station.

Embodiments of the container transporter can comprise container transporter including a motor system for driving and a steering system for directing, both permitting purposeful locomotion of the container transporter along nearly any terrain. Embodiments can provide means for guidance for travel of the container transporter from a parking or docking location to a location for pick up by a refuse collection truck, and return to the parking station. Further, embodiments can provide a platform, enclosure, cradle, nest, grip, arm, or other suitable means for securing a container, for example a refuse container, to the container transporter.

Embodiments of the container transporter can comprise a motor system. For example, embodiments can comprise a wheel, wheels, a track, tracks, or a gyroscopic wheel or ball system to enable movement. The wheel or track can be engaged by a motor system for driving the wheel or track, and thus providing locomotion to the container transporter.

Embodiments of the container transporter can comprise a steering system. For example, a steering motor can be mechanically coupled with a wheel or track to direct the wheel or track in a given direction. Additional embodiments of the container transporter can comprise a swiveling third wheel and a pair of driving wheels independently actuated to provide both locomotion and steering by modifying the rate of rotation of one driving wheel with respect to the other. A further embodiment can incorporate a pair of driving tracks on opposed sides of the container transporter to provide locomotion and steering by differential speed of the driving tracks. Still another embodiment of the container transporter can comprise wide tires or balloon tires to increase the footprint of each wheel and thereby reduce the possibility of the container transporter becoming mired.

Embodiments of the container transporter can comprise a sensor system for detecting ambient conditions. For example, a sensor or multiple sensors can be used to detect obstacles, inclement weather, the presence of a full container, the presence of an empty container, or combinations thereof. The container transporter can comprise different interchangeable operation modules, sensors, and computers capable of interacting with dynamic ambient conditions. These modules, sensors, and computers allow the container transporter to interact with real world conditions and accomplish its current task.

Embodiments of the container transporter can comprise an intelligence system. For example, the intelligence system can be a computer, microprocessor, controller, or combinations thereof. In some embodiments, the intelligence system can direct the motor and steering systems in response to inputs from the sensor system.

Embodiments of the container transporter can comprise a platform suited to a removable container. In some embodiments, the container transporter can comprise a platform having a topless enclosure. In some embodiments, the platform can comprise a dolly system including a lip, arm, and/or grip suited to a removable container. In some embodiment, the platform can be bare, using friction alone to interact with a container. The platform can be suited to a local mandated refuse container(s). In some embodiments, the container transporter can be suited to the container so that modification of the container is not necessary. Thus, a user can continue to use his or her current refuse container.

Some embodiments of the container transporter comprise a parking or docking location or docking station for use in conjunction with the container transporter to store the container transporter or the container transporter and container. For example, some embodiments of the container transporter comprise a parking or docking location for an electric powered container transporter that provides the capability for automatic charging of a battery powering the container transporter. In some embodiments the parking structure can provide shelter for the container transporter and additionally can be configured to charge the vehicle. In some embodiments, the container transporter can comprise a parking or docking location that transfer power from a system designed to capture solar energy.

Some embodiments of the container transporter comprise a method for automatically transporting a container transporter from a parking or docking location to a second location, and returning the container transporter to its parking or docking location. In some embodiments the container transporter can transport both itself and the container from a parking or docking location to a second location. For example, the container vehicle can transport both itself and a refuse container from a parking or docking location to a refuse pick up location, and return itself or both itself and the refuse container to the parking location.

In other embodiments of the present invention, a container transporter comprises a grip arm releasably attaching to a container, the grip arm comprising a first actuator controlling a height of the grip arm, and a second actuator controlling a pitch of the grip arm, a transportation system, and a sensor system detecting when the container has experienced an emptying event, wherein the container transporter upon releasably attaching to the container via the grip arm, transports via the transportation system the container along an emptying path from a storage location to an emptying location, and after the emptying event, transports via the transportation system the container along an emptied path from proximity to the emptying location to proximity to the storage location.

Some embodiments of the sensor system include a weight resistance sensor to detect a difference in the weight of the container from its weight after the emptying event from its weight prior to the emptying event, and a radio frequency identification (RFID) sensor to detect an RFID tag on the container.

Some embodiments of the transportation system include a motor system to move the container transporter, a steering system to steer the container transporter, and an intelligence system to control the motor system and the steering system to intelligently guide the container transporter along the emptying path and the emptied path.

In other embodiments of the present invention, a container transporter comprises a structural interface configured to attach to a container, a transportation system, and a sensor system configured to detect when the container has experienced an emptying event, wherein the container transporter is configured to transport via the transportation system the container along an emptying path from a storage location to an emptying location, and transport via the transportation system the container along an emptied path from proximity to the emptying location to proximity to the storage location.

In other embodiments of the present invention, a container transporter system comprises a container transporter and a docking station configured to charge the battery.

In other embodiments of the present invention, a container transporter system comprises a container transporter and a docking station configured to charge a battery, wherein a sensor system of the container transporter comprises a proximity sensor configured to sense objects in proximity to the container transporter, and wherein an intelligence system uses an input from the proximity sensor to intelligently guide the container transporter along the emptying path and the emptied path while avoiding objects in one or both of the paths. These and other objects, features, and advantages of the container transporter can become more apparent upon reading the following specification.

BRIEF DESCRIPTION OF THE FIGURES

Reference can now be made to the accompanying figures, which are not necessarily drawn to scale, and wherein.

DETAILED DESCRIPTION

To facilitate an understanding of the principles and features of the various embodiments of the invention, various illustrative embodiments are explained below. Although embodiments of the invention are explained in detail as being container transporter or refuse container transporter systems and methods, it is to be understood that other embodiments are contemplated, such as embodiments employing other types of vehicles, containers, or methods of transportation and transporting. Accordingly, it is not intended that the invention is limited in its scope to the details of construction and arrangement of components set forth in the following description or examples. The invention is capable of other embodiments and of being practiced or carried out in various ways. Also, in describing the embodiments, specific terminology can be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology can be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

To facilitate an understanding of the principles and features of the present invention, various illustrative embodiments are explained below. In particular, various embodiments of the container transporter are described as container transporter systems and methods. Some aspects of the invention, however, can be applicable to other contexts, and embodiments employing these aspects are contemplated. For example, some aspects of the invention can be applicable to various types of container transports and/or methods of container transportation, or other types of vehicles altogether. Accordingly, where terms such as "refuse container" or "vehicle" or related terms are used throughout this disclosure, it can be understood that other devices, entities, objects, or activities can take the place of these in various embodiments of the invention.

Figure 1:
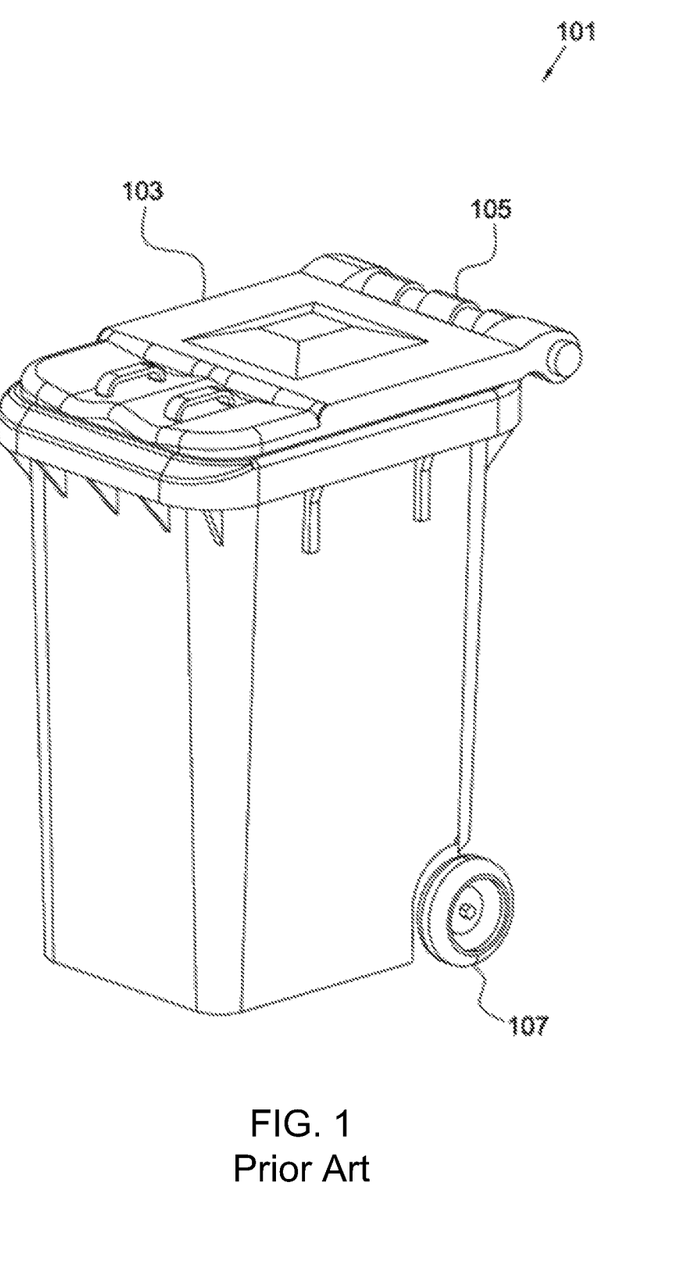
FIG. 1 is a drawing of a prior art refuse container.

As explained above, and as shown in FIG. 1, a problem with existing containers is that they require a user to physically exert themselves to move the container. For example, a problem with the existing refuse container 101 is that it must be pushed or pulled to the curb either the night before or early in the morning of the day of garbage pickup. Thereafter, the refuse container must be transported from the curb and returned to its parking or storage location. These shortcomings require substantial investment in time and effort over the life of a person. Further, for users who are not physically able, moving a container or refuse container can be almost overwhelming. For example, should a user's driveway be inclined downwardly or upwardly toward the curb, the movement of a heavily loaded refuse container can be difficult to control. Moreover, to draw the refuse container up to its storage location, even though empty, can be a difficult physical task. This is despite the fact that many containers, for example refuse containers, include wheels 107 intended to ease movement. It is the function and purpose of the container transporter to permit automatic transport of the container to and from at least a second location to alleviate the strain and potential injury that can result from manually transporting the container. The container transporter can comprise a container transporter that is compatible with any container.

Figure 2:
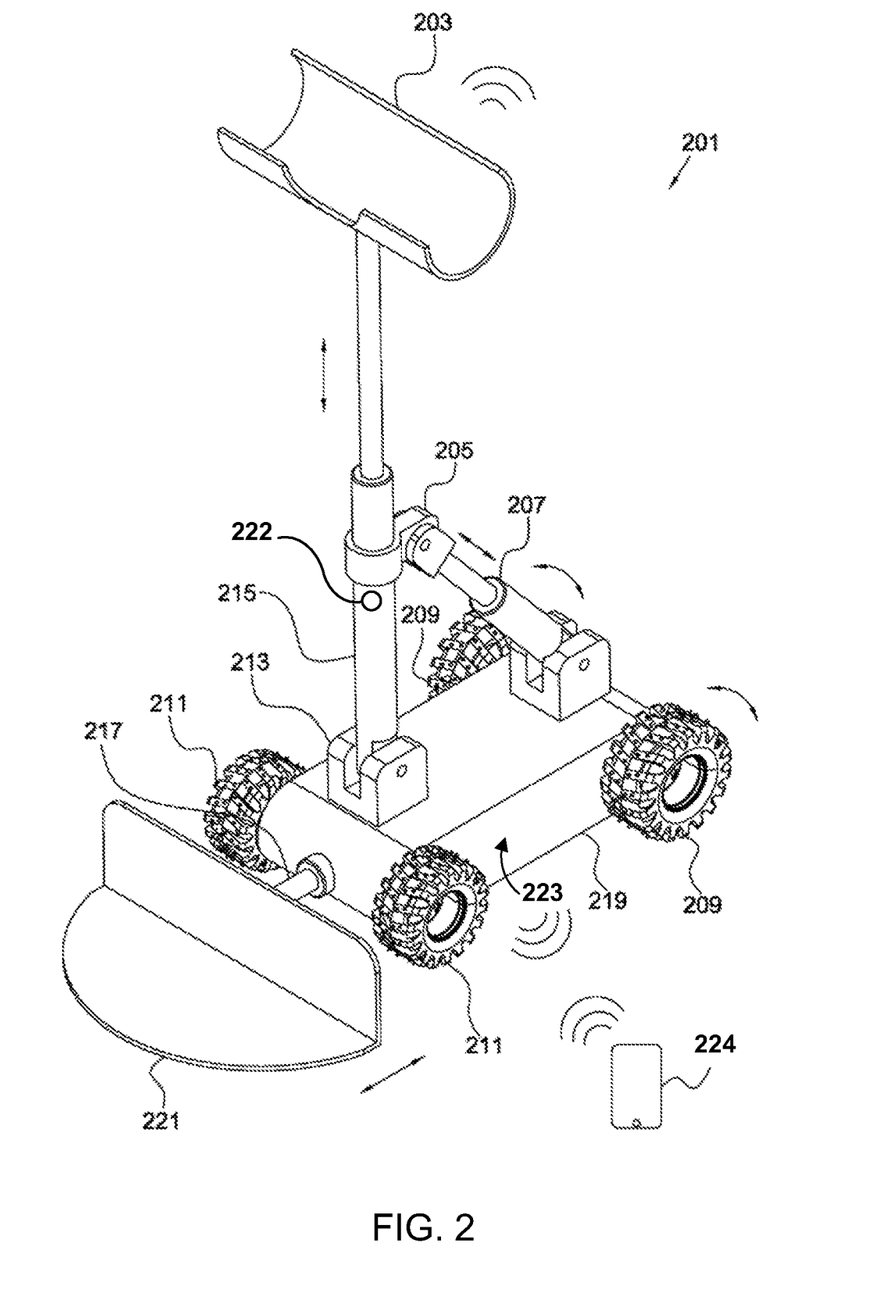
FIG. 2 is a drawing of a container transporter, in accordance with an example embodiment of the presently disclosed subject matter.
Figure 4:
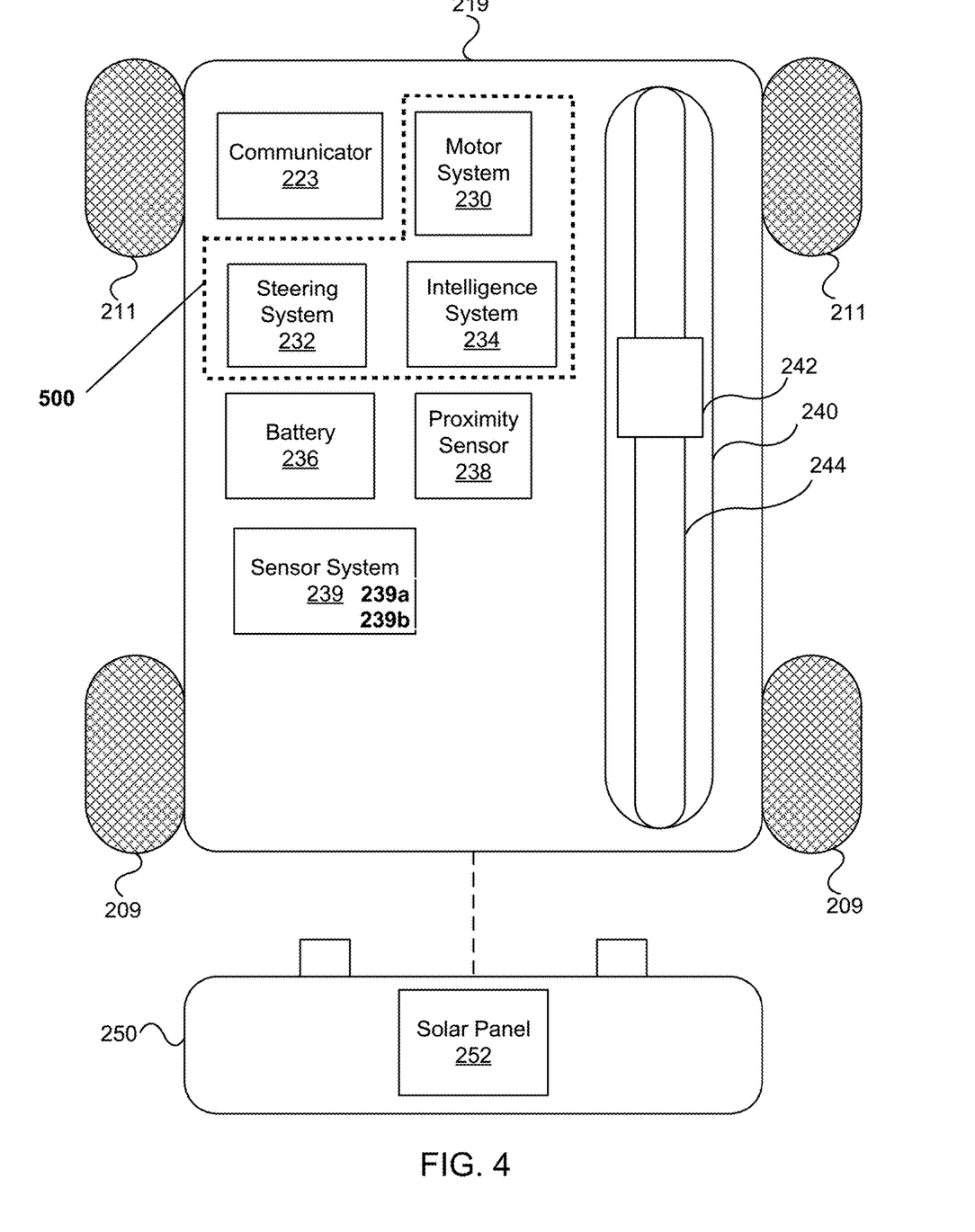
FIG. 4 is a schematic diagram of a container transporter, in accordance with an example embodiment of the presently disclosed subject matter.

Embodiments of the container transporter described herein provide several solutions to the problems with the prior art. For example, as shown in FIG. 2 and FIG. 4, an embodiment of the container transporter can include a chassis 219, wheels 209, 211 and a transportation system 500. The transportation system can comprise a motor system 230 configured to move the container transporter 201, and/or a steering system 232 configured to steer the container transporter, and/or an intelligence system 234 configured to control the motor system 230 and the steering system 232 to intelligently guide the container transporter. The wheels 209, 211 can operate in unison, separately, or in tandem, for example, with the front wheels 211 operating independently from the back wheels 209. The wheels can be operated by a motor and control unit contained in a chassis 219. The chassis can contain other modules, including the intelligence system 234, for example, to operate the container transporter.

Embodiments of the container transporter can comprise a motor system 230 and/or a steering system 232. For example, embodiments can comprise a wheel, wheels, a track, tracks, and/or a gyroscopic wheel or ball system to enable movement. The wheel or track can be engaged by a motor system 230 for driving the wheel or track, and thus providing locomotion to the container transporter. In some embodiments, a steering motor can be mechanically coupled with a wheel or track to direct the wheel or track in a given direction. In some embodiments, the container transporter can comprise a swiveling third wheel and a pair of driving wheels independently actuated to provide both locomotion and steering by modifying the rate of rotation of one driving wheel with respect to the other. A further embodiment can incorporate a pair of driving tracks on opposed sides of the container transporter to provide locomotion and steering by differential speed of the driving tracks. Some embodiments may use differential speed of wheels or other movement systems to provide locomotion and steering.

In some embodiments, the container vehicle can comprise a wheel or wheels housed in a wheel compartment or wheel compartments. A compartment can be formed above a wheel to house various elements attendant operation of the wheel. This compartment can be formed by a wall extending interiorly of another wall conventionally formed as part of front of the container transporter. A steering motor can be mechanically coupled with a fork supporting the wheel, and the motor can be attached to and supported by a flange of a sliding member. Upon actuation of the steering motor, the wheel can be caused to pivot. A jack screw mechanism can include a motor secured with a flange of the sliding member. These features can also be used on a wheel without a wheel compartment.

Figure 6A:
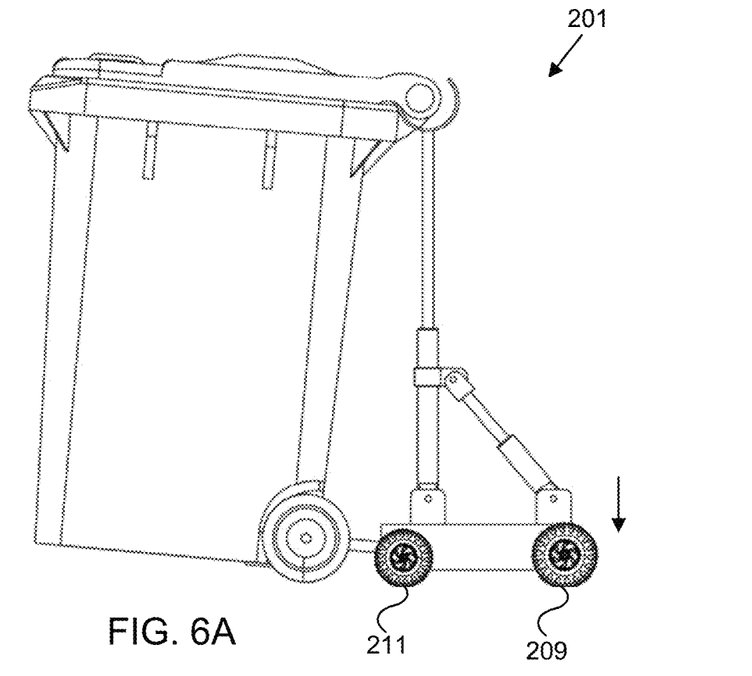
Figure 6B:
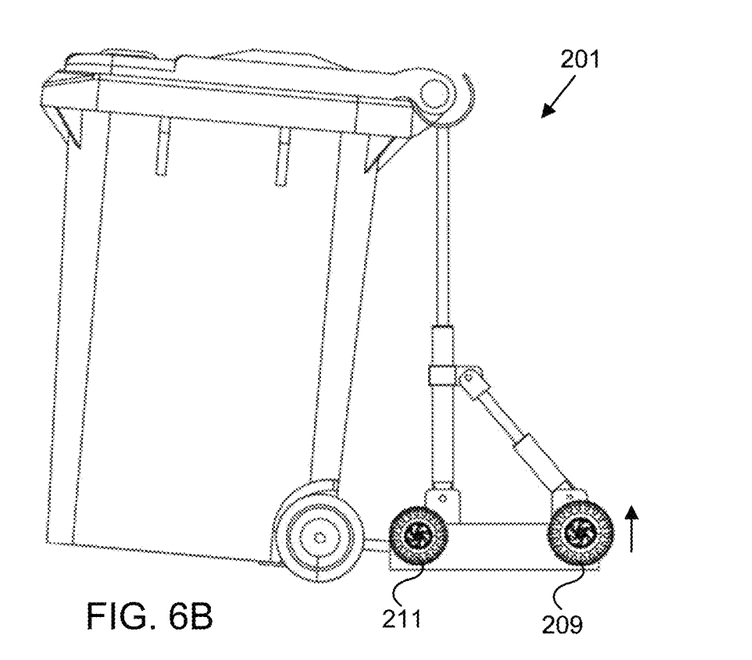
Figure 7:
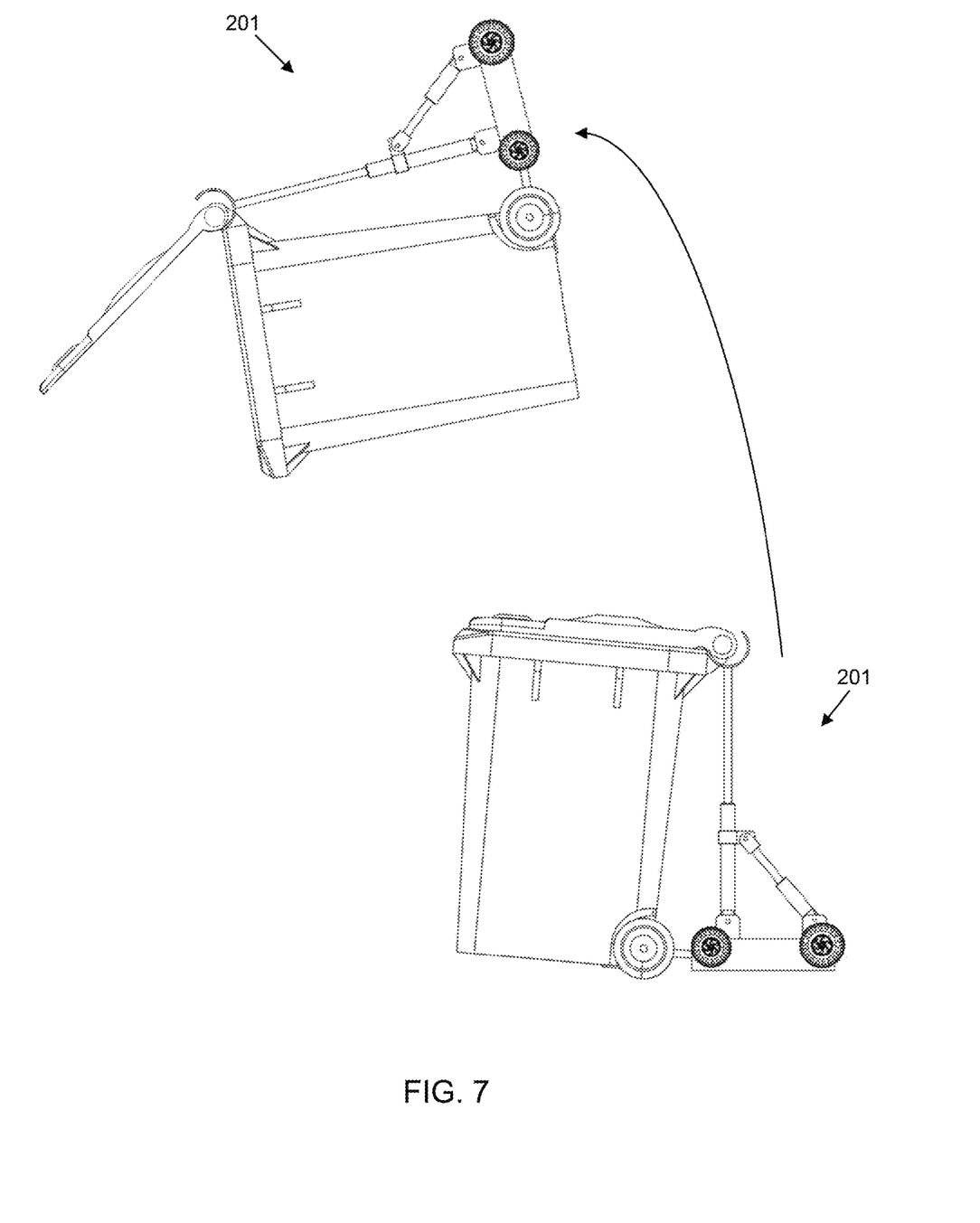

In some embodiments, the container vehicle can comprise a jack screw that can engage a jack nut. A frame can be secured to the front of the container transporter by mounting elements, each of which elements can include a conventional nut and washer to secure the frame to the front of the refuse container. Upon activation of motor of the jack screw mechanism, the jack screw can rotate in threaded engagement with the jack nut. This can cause sliding member to move upwardly and thereby retract wheel to a location above the bottom of the container transporter (as depicted in FIGS. 6A and 6B). With such retraction, the container transporter has a limited ability to roll because of the friction between its bottom and the ground. Moreover, in an example embodiment where the container transporter and refuse container are joined and where the wheel can be retracted, the retraction can limit or eliminate damage during raising of the coupled refuse container and container transporter off of the ground (as depicted in FIG. 7), and while placing the combination on the ground.

In some embodiments, the container transporter can comprise wheels mounted upon axles of a power unit. For example, the power unit can comprise an electric motor, gas motor, or other suitable motor. In an electric motor, a battery 236 can be used to power the motor. A power unit can include an output shaft that can be mounted in bearings and extend into a gear box. An output gear of the gear box can cause rotation of shaft supporting the wheels, and the shaft can be journaled in the bearings. It can be to be understood that the motor can be caused to rotate in either direction with commensurate rotation of the wheel mounted on the shaft. A further motor causes rotation of output shaft journaled in bearings. The output shaft can be connected to a gear box having an output gear for driving shaft supporting wheel. The shaft can be mounted within the bearings. The motor can be capable of rotating in either direction to provide a commensurate direction of rotation of shaft and wheel attached thereto. A control unit for controlling operation of motors can be mounted within space intermediate the motors. The power unit, control unit, battery 236 and/or related equipment can be mounted within a power and control chassis secured to the container transporter. The power unit, control unit, battery 236, and/or other related equipment can also each be in a separate or interconnected chassis.

In some embodiments, the container transporter can comprise a driving wheel which permits elimination of power unit driving rear wheels. A wheel motor can be in operative engagement with a wheel to cause the wheel to rotate on command in either direction. Electrical power for a wheel motor, as well as for steering motor and jack screw mechanism, can be provided by a battery. Control of these three motors can be affected by a control unit. The motor and related equipment can be stored in a chassis.

In some embodiments, the container transporter can comprise a container transporter having a pair of tracks disposed on each side. These tracks can be in lieu of or in addition to wheels. These tracks can provide traction over relatively soft ground, loose rocks, and snow. The tracks can also climb irregular terrain (such as drop off at the end of a driveway) better than the wheeled version. Additionally, by operating at different speeds, turning movement of the container transporter can be achieved. Operation of the two tracks can be controlled by a control unit working in tandem with a tracking unit.

In some embodiments, the container transporter can comprise wide wheels or balloon tires in lieu of or in addition to wheels or tracks. The wide wheels or balloon tires can act to traverse soft ground and to reduce the likelihood of becoming mired in either mud or snow, relative to conventional wheels.

Embodiments of the container transporter can comprise a sensor system 239 for detecting an ambient condition. In some embodiments the container transporter comprises different interchangeable operation modules which are selectively and autonomously dockable to the container transporter. Such a system makes it economically feasible to develop robot applications to fulfill a plurality of operations. The container transporter can additionally be equipped with the latest state-of-the-art navigational, speech recognition, communication and decision-making hardware and software, since the same autonomous mobile robot can then be used for a plurality of different applications.

Figure 5:
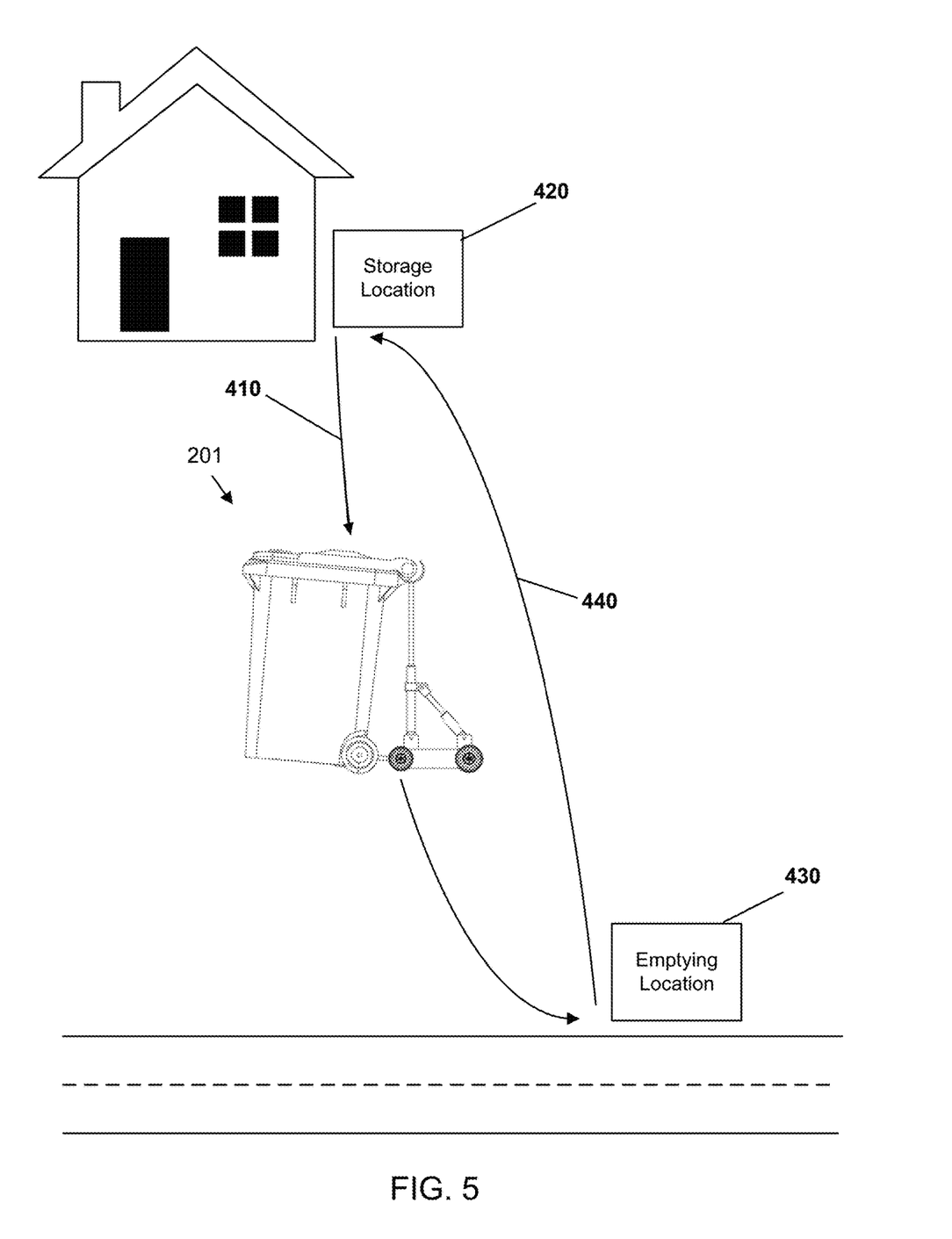
FIG. 5 is a drawing of a container transporter transporting a refuse container from a storage location to an emptying location, in accordance with an example embodiment of the presently disclosed subject matter.

In some embodiments, the sensor system 239 can comprise a guidance system. The guidance system can aid automated transport of the container transporter between its parking or docking location and a second location (as depicted in FIG. 5), or between any number of locations. For example, the container transporter 201 can be configured to, upon releasably attaching to the container 101, transport the container along an emptying path 410 from a storage location 420 to an emptying location 430, and after the emptying event, transport container along an emptied path 440 from proximity to the emptying location 430 to proximity to the storage location 420. The term proximity here is well understood by those of skill in the art to mean that the present invention can move the full and empty container from a variety of locations that need not be exactly the same as prior locations since sidewalks and driveways can crumble or have other events that make absolute unity of pickup and drop-off locations nearly impossible. Returning to the guidance system, it can take any one of several forms. For example, a global positioning system (GPS) can be employed. To improve accuracy, a magnetic strip placed along the desired track can be used. Such a strip would be sensed by a sensor on the container transporter to control the direction of travel both to and from the storage location. At locations wherein the track is unlikely to be covered by snow, a stripe can be painted along the track and light sensors on the container transporter would detect the stripe of paint and provide input signals to the control unit to maintain travel along the stripe. An electrically energized wire placed on the ground commensurate with the desired track or buried in the ground can be used to guide the travel of the refuse container. The electrical field generated by such wire can be sensed and provide the requisite control signals to the control unit to guide the travel of the refuse container.

In some embodiments, the container transporter can comprise or can further comprise guidance system similar to a dead reckoning system. The purpose of such a system is to manually transport the container transporter along the desired track to manually control the speed, direction of travel and change in direction of travel commensurate with the desired track and recording such movement in a memory of the control unit. This can be accomplished by attaching a handle to fork pivotally extending from a housing, which, in fact, corresponds with front of the container transporter. After attachment of handle, the container transporter can be transported along the intended path. As the wheels rotate, a signal can be generated by motor reflective of the speed of rotation. Data attendant such signal can be stored in a memory of the control unit. Similarly, any rotation of fork can produce rotation of the armature of motor and generate a signal. This signal can also be stored in the memory of a control unit. To initiate this "teaching" of the path to be followed by the refuse container, a button or other switch can first be actuated. After such manual transport of refuse container, the path from a storage location of the container transporter to the curb and return can be recorded in the memory of the control unit. Thereafter, upon actuation of the automated system, the trash container can travel in the path "taught" at a predetermined speed. After arrival at the curb, a wheel 209, 211 can be retracted (as depicted in FIG. 6B). Retraction of the wheel prior to engagement of the container transporter by the arms of the garbage truck can terminate control inputs to motivate the refuse container. Upon subsequent extension of wheel as depicted in FIG. 6A) after the container transporter was placed on the ground by the arms of the garbage truck, the control system can cause the container transporter to return to its storage location.

As seen in FIG. 2, an example container transporter 201 can contain one or more actuators 207, 215, 217. These actuators can be used to control one or more feature of the container transporter. For example, the actuator 217 can be used to control and effect the dolly lip 221. The dolly lip 221 can in turn interact with a container. For example, the dolly lip 221 can slide under a refuse container. As an additional example, the actuator 215 can be used to extend or manipulate a grip arm 203. For example, the grip arm 203 can extend away from the container transporter to make contact with a container, capture the container, and pull the captured container back towards the container transporter. The grip arm 203 can perform any of these actions independently or in any combination. Further, the grip arm 203 can capture a container using any number of standard means, including, for example, a friction fit, claw, hook, or hinged apparatus. As yet another example, the actuator 207 can be used to change the tilt or angle of the grip arm 203. The actuator 207 can use a hinge 205 to connect it to the grip arm 203, allowing multiple independent and/or coordinated movements of the grip arm 203. For example, the grip arm 203 can independently or in coordinated movements extend, tilt, grab, capture, pull, and move a container. As an additional example, a series of coordinated movements can be used to capture and tilt a refuse container with wheels, allowing the container transporter to roll the refuse container in the same or similar way that user would manually operate the refuse container. One or more of the actuators 207, 215, 217 and grip arm 203 can additionally comprise one or more sensors 222, for example, a resistance sensor or radio frequency identification sensor that allows interaction with surrounding objects, for example, a container.

In some embodiments, the container transporter can comprise numerous sensors, controls and actuators incorporated in the control unit of the container transporter or as several interconnected modules. For example, an input/output module can include primary controls for operation of the container transporter, as represented by a keyboard. A processor module can include a central processor unit, generally referred to as a microprocessor, for controlling operation related to activation and movement of the refuse container. A sensor system 239 or module can include any or all of a plurality of sensors including, but not limited to, a global position sensor, radio frequency identification (RFID) sensor, resistance sensor, weight sensor, electronic compass direction sensor, vision camera, tilt sensor, bump sensor, accelerometer 239a, microphone, ultra-sonic range sensor, radio tag sensor, path following sensor, lid open/close sensor, moisture sensor, weight resistance sensor 239b, light sensor, fault detection, and training sensor. Certain of these sensors can be related to and a function of the tracking unit incorporated with the container transporter to control travel of the refuse container. In particular, the tracking unit can incorporate any of global position sensor, RFID sensor, electronic compass direction sensor, vision camera, ultra-sonic sensor, radio tag sensor, and path following sensor. It is to be understood that the ground across which the container transporter is to travel from its storage location to the location of discharge of refuse and return can be denoted by a length of wire to be sensed, whether or not it is electrically charged, a plurality of magnets or magnetic strip to be sensed or other path denoting element that is readily sensed to control the direction of travel of the refuse container.

Alternatively, for example, a global positioning unit programmed to control travel of the container transporter in accordance with a preset path can be used. As a further example, a system of dead reckoning preset in the microprocessor can be incorporated. It is to be understood that the various other tracking units can be embodied either alone or in combination in the invention. In some embodiments, one or more actuator will be used. For example, actuators may be screw drive actuators, hydraulic fluid actuators, or any actuator suitable for the purpose.

In some embodiments, the container transporter can comprise various ancillary sensors that can be incorporated for safety or other reasons. For example, a proximity sensor 238 can be used to prevent damage by contact of an immobile or mobile element/person. As a further example, to prevent inadvertent spillage of refuse by the container transporter tilting, a tilt sensor can be incorporated. As yet another example, to properly align a container with the container transporter, RFID sensor(s) and/or actuators can be controlled to secure the container and properly position it. Various optical apparatus can be used as a sensor to prevent collision with an object or person. By suitable programming, such optical apparatus can even be used to control the direction of travel and rate of travel of the refuse container. Additionally, in some embodiments, the container transporter can include a panic button to immediately terminate movement.

Embodiments of the container transporter can comprise an intelligence system 234. For example, in some embodiments a control unit, which can include a processor and various circuitry subject to input signals, can control operation of motor system 230, steering system 232, jack screw mechanism, and/or actuator modules. In another example, the container transporter can comprise an on-board computer, a plurality of sensors, a signaling interface a mechanical coupling interface and communication means, wherein the on-board computer uses inputs from the plurality of sensors to activate the various components to direct the container transporter to accomplish its objective.

In some embodiments, the container transporter can comprise a computer having a processor, memory means, and a plurality of computer programs for controlling the container transporter. The memory can store digital maps of the present environment, as well as navigation beacons and information of each and every operation module. The memory can also carry strategies for navigation, orientation, maneuvering, communication, and strategy for avoiding collisions. All information and programs can be supplied by a network, such as a wireless local area network (LAN) or the Internet. The sensors can comprise distance measuring means, such as an ultrasonic radar, sound measuring means, such as a microphone, and visual measurement system, such as a vision system including optics and an image sensor like an electronic device that is capable of transforming a light pattern (image) into an electric charge pattern, such as a Charge-Coupled-Device (CCD).

In some embodiments, the container transporter can comprise an intelligence system 234 that can activate control modules based on motor system 230 and/or steering system 232 in the container transporter. For example, a control module or control modules would be activated to control operation of the left motor and a second control module or control modules would be activated to control the right motor in the case where the pair of wheels at the rear of container transporter are the driving wheels. In the event a wheel at the front of the container transporter is both the driving wheel and the steering wheel, a single control module can be actuated. A tilt actuator module can be actuated to raise and lower wheel at the front of the container transporter to avoid damage thereto during the process of having the container transporter raised and lowered by, for example, a garbage truck. Similarly, an actuator module can be actuated to raise and lower a dolly lip and/or grip to interact with a container. If a lid is to be raised and lowered on command, a lid actuator module can be incorporated. Power for operating the driving wheels, the steering wheel and the control unit, including the tracking unit, can be provided by a power module. A power module can include one or more batteries to provide a source of electrical power and can be configured for effecting charging of the battery 236. Charging of the battery 236 can take place, for example, at a parking or docking location 250. In several embodiments there is no need to raise or lower wheels, as the container transporter will not be picked up with a container. In some embodiments, however, it is beneficial to have the ability to raise and lower wheels, as it can prevent damage to the container transporter. In these embodiments, it can be useful to include a rubber or other cushioning material on the bottom of the container transporter. For example, in an embodiment where the container transporter is configured to be picked up with the container as depicted in FIG. 7), it could have a rubber bottom and retracting wheels (as depicted in FIGS. 6A and 6B). Such an example could be an embodiment where the container transporter and container are a single unit, for example, where a new locally mandated refuse container is a "smart trash can."

In some embodiments, a wireless communication module can be included. Wireless communication can be autonomous or involve a user. For example, container transporter can use wireless communication between itself and a fixed location to control travel and other operations of the container transporter. As indicated, a power bus can interconnect a power control module with each of the other modules to provide electrical power as required. A communication bus can interconnect a main processor module with each of the remaining modules to control their respective operations.

Embodiments of the container transporter can comprise a platform suited to a removable container. For example, in some embodiments, the container transporter can comprise a platform having a topless enclosure. The enclosure can be 6 to 36, 12 to 30, 18 to 24, 18 to 30, 24 to 36, or 12 to 24 inches tall. In some embodiments, the enclosure can be slightly larger than the refuse container. For example, the topless enclosure can be circular or square, with radius or length slightly longer than the radius of the intended container. Different sizes of the container transporter can be available to accommodate various sizes of refuse containers. For example, the radius of the enclosure can be 6 to 36, 12 to 30, 18 to 24, 18 to 30, 24 to 36, or 12 to 24 inches wide, or larger if necessary. In some embodiments the topless enclosure can be suited to fit a standard size refuse container. For example, the topless enclosure can be suited to fit a 32-gallon, 44-gallon, or 50-gallon refuse container.

The platform can also be configured to hold a refuse container via friction. In some embodiments, the platform can comprise no enclosure, lip, dolly system or dolly lip, or grip. In some embodiments, the platform can contain a nest-like or cradle-like top suited to a container. For example, while not really being an enclosure, it can be useful to have a platform with a graduated edge that can help guide or provide additional stability to a container.

In some embodiments, the platform can comprise a frame secured to the front of the container transporter by mounting elements. The frame can comprise a dolly lip 221 that can slide under a container. For example, a dolly lip 221 can be used to slide under a refuse container that contains wheels, engaging the refuse container and allowing the platform to take advantage of the refuse container's intended use. In some embodiments, the dolly lip 221 can be effected by an actuator module or system of actuator modules. In some embodiments, the frame can comprise a topless enclosure into which a refuse container can be placed. In some embodiments, a counterweight 242 or counterweight system 240 can be used. For example, in an embodiment where a frame is attached to the platform, a counterweight 242 can be added to account for the weight of a container. A counterweight 242 or counterweight system 240 can contain actuators 244 or other common means of moving the counterweight 242 that allow for movement. For example, a counterweight system 240 can be moved by an actuator 244 based on one or more sensors that detect the weight of a container, providing the entire system with a desired center of balance.

In some embodiments, the container and the container transporter can be fused or inseparable. In this embodiment, the container transporter would not move separately from the container, but instead would always travel with the container because it would be a part of the container, not a separate machine or component of a system. This can be, for example, a "smart trash can" that can be autonomous or remote controlled. For example, the local mandated refuse container can be updated to be such a "smart trash can," in which case the "smart trash can" would travel from its parking or docking location to a second location, for example, an area designated for refuse pickup, and then the "smart trash can" can travel back to its parking or docking location. In some embodiments, the container transporter can travel to multiple predetermined locations.

In some embodiments, the platform can comprise an additional arm, grip, and/or other means of interacting with the container. This arm, grip, and/or other means can be in addition to or in lieu of a frame, dolly lip, or topless enclosure. In some embodiments, the platform and/or container transporter can comprise a grip controlled by one or more actuators, which uses an RFID system to interact with and secure a container. For example, a grip effectuated by one or more actuators can extend from the container transporter and use a RFID sensor to detect an RFID tag on a refuse container, thereby locating and securing the refuse container.

As seen in FIG. 2, an example container transporter 201 can include a grip arm 203 or chassis 219 that comprise one or more communicators. For example, the grip arm 203 can comprise a RFID sensor that can detect an RFID tag on a container. As an additional example, the chassis 219 can contain a wireless communication device 223 configured to interact with another wireless communication device 224, for example, a cell phone, that can allow control or manipulation of the container transporter and its components. The grip arm 203 or chassis 219 can additionally have an RFID sensor that interacts with a parking or docking location 250. For example, the RFID sensor can guide the container transporter to its parking or docking location, allowing for, for example, storage, charging, or protection from the elements. Embodiments of the container transporter can comprise a communicator. The communicator 223 or communication devices can interact with, for example, garage doors, home gates, a parking or docking location, and/or a mobile phone. Such communication devices can be of the standard variety including, but not limited to, infrared, RFID, and other communication means. As an additional example, an RFID system can be used to allow the container transporter to interact with a container at one or more points. As yet another example, a container transporter can use an RFID system to interact with a refuse container with wheels, such as a locally mandated refuse container fitted with a RFID tag, using the refuse container's intended design to tilt and transport the refuse container to and from a desired location. An RFID system can additionally be used to navigate the container transporter between one or more locations.

Embodiments of the container transporter can include a parking or docking location 250. In some embodiments the parking or docking location 250 includes a platform for supporting the container transporter. Side rails can extend from the platform to guide entry of the refuse container, and can include a tapered design to facilitate easier entry. The platform can include non-skid surfaces to insure traction of the wheels and/or tracks located at the rear of refuse container. In the event a wheel at the front of the container transporter is the driving wheel, a further non-skid surface would be incorporated for engagement by this wheel. If the charging unit for the battery or batteries in the container transporter is mounted at the bottom of the refuse container, an induction charger interface can be located upon platform to effect charging of the battery or batteries. In some embodiments, a cord can be used to connect a charging unit, such as an electrical outlet, and a battery powering the container transporter. A module can be located at the rear of the parking or docking location to house the various components attendant the refuse container. A keypad/display module can be mounted on a stanchion extending from module. It can provide means for controlling operation of the parking or docking location and to provide visual cues of various functions to be performed and being performed. A power cord can be used to interconnect module with a source of power. Additionally, a cord can be used to interconnect module and the equipment therein with the internet or with a telephone wire. The parking or docking location 250 can additionally incorporate wireless internet or other wireless connectivity, such as using short-wavelength UHF radio waves, for example in the ISM band from 2.4 to 2.485 GHz. In some embodiments the parking or docking location provides the capability of maintaining the batteries within the container transporter fully charged and provides the capability for controlling operation and travel of the container transporter in accordance with a preset pattern. Additionally, it can provide an indication of the status of various components and the capability for interconnecting the control unit of the container transporter with a remote location.

In some embodiments, the container transporter can comprise various modules and sensors for determining operation of certain components in the container transporter, which can be incorporated in the parking station. Communication there between can be provided by wireless communications, as reflected by antennae.

In some embodiments, the container transporter can comprise various other modules that can be incorporated into the parking station 250. In particular, various modules and certain functions that can be performable by keypad/display. A wireless module includes several components, as listed, for communicating with the container transporter. Various sensors can be incorporated. Power module includes various components relating to charging and maintenance of the battery or batteries embodied within the refuse container. The parking or docking location 250 can include a connector for charging by a solar panel 252 and various other functions. Operation of these modules is controlled by processor module, which can be in the form of a microprocessor, as represented by a central processor unit. The processor module is interconnected with the remaining modules through a communication bus. Additionally, a power bus, represented by triple lines, provides power to the modules.

Figure 3A:
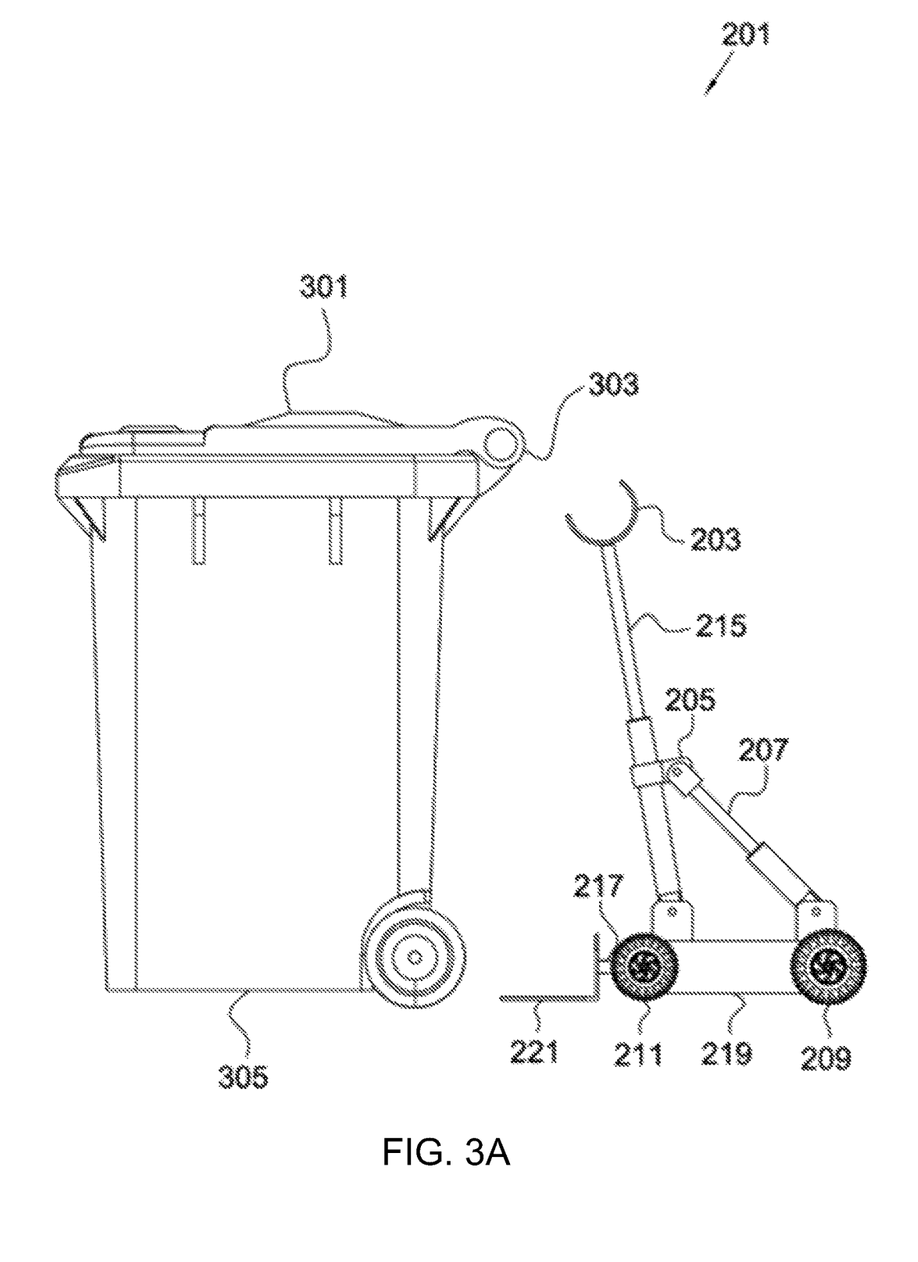
FIG. 3A is a drawing of a container transporter, in accordance with an example embodiment of the presently disclosed subject matter, and a refuse container.
Figure 3B:
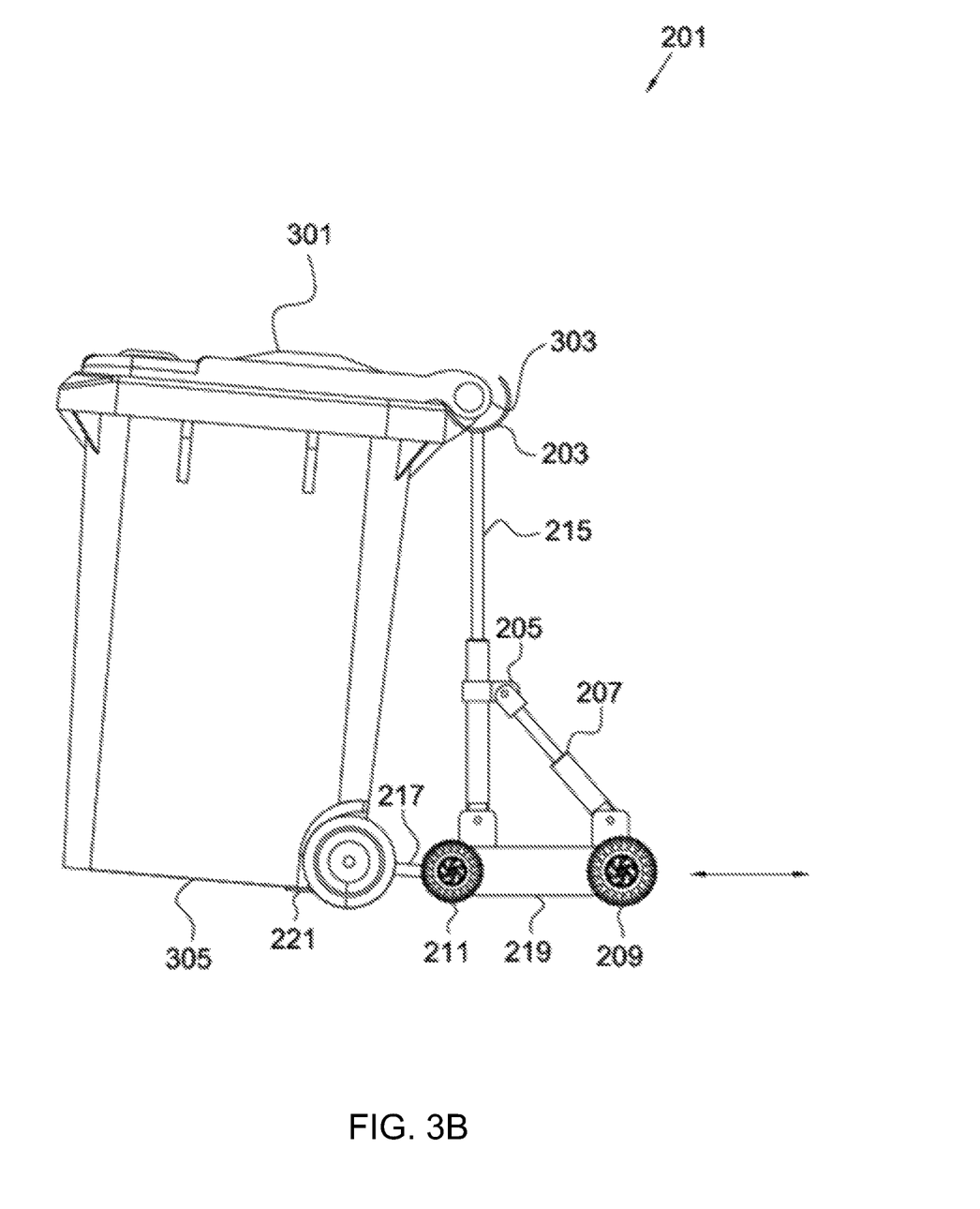
FIG. 3B is another drawing of a container transporter, in accordance with an example embodiment of the presently disclosed subject matter, and a refuse container.

As shown in FIGS. 3A and 3B, embodiments of the present invention can further comprise methods of transporting a container. For example, in some embodiments, the grip arm 203 and dolly lip 221 of a container transporter can interact with a refuse container handle 303 and refuse container base 305, respectively. This interaction can be accomplished through one or more actions taken together, in succession, or independently. For example, the wheels 209, 211 of a container transporter can position the container transporter so that the grip arm 203 is proximate a refuse container. The grip arm 203 can then extend and/or tilt to interact with a refuse container handle. As an additional example, as seen in FIG. 3B, the grip arm 203 can capture the refuse container handle 303, tipping the refuse container into a position where the friction from the refuse container base 305 is no longer creating sufficient friction to prevent the refuse container's wheels from rotating. Similarly, the dolly lip 221 can extend, tilt, and/or lift on the refuse container base 305, providing a second contact point for the container transporter with the refuse container. Once the refuse container's wheel can rotate, the container transporter can guide, pull, or otherwise move the refuse container to a desired location using the container transporter's motor system 230 and/or steering system 232. While, a refuse container is used as an example, and is shown in FIGS. 3A and 3B, a person of skill in the art will appreciate that the container transporter is not limited to such examples.

Those of skill in the art will recognize that the method steps described herein can be performed in various orders, and thus the order of steps described above is not limiting. For example, the container transporter can have only one point of contact with a container, such as the grip arm 203 or the dolly lip 221. As an additional example, the dolly lip 221 can make the initial contact with the container, followed by the grip arm 203.

The container transporter can also travel to numerous positions, incorporating multiple steps in multiple order. Embodiments and examples in this paragraph are not exhaustive. In some embodiments, the container transporter can travel from its parking or docking location to the desired container, capture the container, move itself and the container to a desired second location, and return to parking or docking location. In another embodiment, after moving itself and the container to a desired second location, the container transporter can stay with the container until a desired time or until a desired event has occurred, and then travel with the container back to a parking or docking location. The desired event can be sensed by one or more sensor of the container transporter. For example, a weight or resistance sensor can detect that the container has been emptied or removed. In yet another embodiment, the container transporter, after moving itself and the container to a desired second location, can move itself to a third location, wait for a desired time or event, again retrieve the container, and transport itself and the container to the parking or docking location. For example, the container transporter can move to a third location proximate a location designated for refuse pickup, but out of the way of the container and any interaction from a third party, for example, a trash collector. In still another embodiment, the container transporter can transport the container from a desired second location back to the same location it originally retrieved the container from, to a new location, to the area proximate the container transporter's parking or docking location, or the container transporter can remain in contact with the container while it returns to its parking or docking location.

As described above, in some embodiments, a container transporter need not comprise all or even some of the elements shown FIG. 2, 3A, or 3B. The Figures and the examples provided above are provided merely to illustrate one or more embodiment of the disclosed container transporter. Thus, while certain systems and methods related to container transporters, and specifically refuse container transporters, have been disclosed, many modifications, additions, and deletions may be made without departing from the spirit and scope of the system, method, and their equivalents, as set forth in the claims. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented in this application. It is important, therefore, that the claims be regarded as including such equivalent constructions.

What is claimed is:

1. A container transporter comprising:
   at least one wheel;
   a transportation system configured to one or more:
   move the container transporter;
   steer the container transporter; and
   intelligently guide the container transporter along an emptying path and an emptied path; and
   a sensor system comprising:
      a radio frequency identification (RFID) sensor to pair the container transporter with a container having an RFID tag identifying the container as the one to be transported by the container transporter; and
      a second sensor to detect when the paired container has experienced an emptying event, wherein the second sensor comprises an accelerometer configured to detect when the paired container has experienced the emptying event;
      wherein the sensor system further comprises a weight resistance sensor configured to detect a difference in a weight of the paired container from its weight after the emptying event from its weight prior to the emptying event;
   wherein the container transporter is configured to:
      transport via the transportation system the paired container along the emptying path from a storage location to an emptying location; and
      transport via the transportation system the paired container along the emptied path from proximity to the emptying location to proximity to the storage location; and
   wherein the at least one wheel automatically retracts from an extended position to a retracted position to protect the container transporter when the paired container experiences the emptying event.

2. The container transporter of claim 1 further comprising a grip arm releasably attaching to a container, the grip arm comprising:
   a first actuator controlling a height of the grip arm; and
   a second actuator controlling a pitch of the grip arm;
   wherein the container transporter:
      upon releasably attaching to the container via the grip arm, transports via the transportation system the container along the emptying path from the storage location to the emptying location; and
      after the emptying event, transports via the transportation system the container along the emptied path from proximity to the emptying location to proximity to the storage location.

3. The container transporter of claim 1, wherein upon detection via the sensor system that the container has experienced the emptying event, the container transporter is further configured to thereafter transport the paired container along the emptied path.

4. The container transporter of claim 1, wherein the container transporter is configured to remain attached to the container when the paired container experiences the emptying event.

5. The container transporter of claim 1, wherein the transportation system comprises:
   a motor system configured to move the container transporter;
   a steering system configured to steer the container transporter; and
   an intelligence system configured to control the motor system and the steering system to intelligently guide the container transporter along the emptying path and the emptied path.

6. The container transporter of claim 1 further comprising a communicator configured to interact with a paired communicator and the transportation system.

7. The container transporter of claim 1 further comprising:
   a communicator configured to interact with a paired communicator and the transportation system; and
   a battery configured to provide power to the container transporter; wherein:
   the transportation system comprises:
   a motor system configured to move the container transporter;
   a steering system configured to steer the container transporter; and
   an intelligence system configured to control the motor system and the steering system to intelligently guide the container transporter along the emptying path and the emptied path;
   the container is a refuse container.

8. A container transporter system comprising:
   the container transporter of claim 7; and
   a docking station configured to charge the battery.

9. The container transporter system of claim 8, wherein the docking station comprises a solar power system.

10. The container transporter system of claim 8, wherein the container transporter further comprises a communicator configured to interact with a paired communicator and the transportation system.

11. The container transporter system of claim 10, wherein the paired communicator is a cell phone.

12. The container transporter system of claim 5, wherein the at least one wheel comprises at least two wheels and the steering system and the motor system control the at least two wheels at differential speeds to direct the container transporter along the emptying path and the emptied path; and
   wherein the intelligence system further controls the steering system and the motor system to intelligently guide the container transporter along the emptying path and the emptied path.

13. A container transporter system comprising:
the container transporter of claim 1, the container transporter further comprising:
a platform suited to the container comprising:
a grip arm comprising:
a first actuator to affect a height of the grip arm;
a second actuator to affect a pitch of the grip arm;
a sensor selected from the group consisting of a weight sensor and a radio frequency identification (RFID) sensor; and
a grip to capture the container; and
a dolly lip attaching to the platform by at least one actuator, wherein the at least one actuator can extend, tilt, and lift the dolly lip; and
a docking station to receive the container transporter and to provide an electric charge to the container transporter.

14. The container transporter system of claim 13, wherein the container transporter further comprises a communicator for interacting with a paired communicator and the transportation system.

15. The container transporter system of claim 14, wherein the docking station further comprises a solar power system to transfer energy from the docking station to the container transporter.

16. The container transporter system of claim 14, wherein the paired communicator is an opening/closing assembly that one or both:
opens/closes a garage door when activated by the communicator; and
opens/closes a gate when activated by the communicator.

17. A container transporter comprising:
at least one wheel;
a rubber material;
a transportation system comprising:
a motor system configured to move the container transporter;
a steering system configured to steer the container transporter; and
an intelligence system configured to control the motor system and the steering system to intelligently guide the container transporter along an emptying path and an emptied path; and
a sensor system comprising:
a radio frequency identification (RFID) sensor to pair the container transporter with a container having an RFID tag identifying the container as the one to be transported by the container transporter; and
a second sensor to detect when the paired container has experienced an emptying event, wherein the second sensor comprises an accelerometer configured to detect when the paired container has experienced the emptying event;
wherein the sensor system further comprises a weight resistance sensor configured to detect a difference in a weight of the paired container from its weight after the emptying event from its weight prior to the emptying event;
wherein the container transporter is configured to:
transport via the transportation system the paired container along the emptying path from a storage location to an emptying location; and
transport via the transportation system the paired container along the emptied path from proximity to the emptying location to proximity to the storage location;
wherein the at least one wheel automatically retracts from an extended position to a retracted position to protect the container transporter when the paired container experiences the emptying event; and
wherein the rubber material is provided on a bottom surface of the container transporter to protect the container transporter when the container experiences the emptying event.

18. The container transporter of claim 17 further comprising a communicator configured to interact with a paired communicator and the transportation system;
wherein upon detection via the sensor system that the container has experienced the emptying event, the container transporter is further configured to thereafter transport the paired container along the emptied path;
wherein the container transporter is configured to remain attached to the container when the paired container experiences the emptying event;
wherein the at least one wheel comprises at least two wheels and the steering system and the motor system control the at least two wheels at differential speeds to direct the container transporter along the emptying path and the emptied path; and
wherein the intelligence system further controls the steering system and the motor system to intelligently guide the container transporter along the emptying path and the emptied path.

* * * * *